United States Patent
Abbaszadeh et al.

(10) Patent No.: US 10,671,060 B2
(45) Date of Patent: Jun. 2, 2020

(54) DATA-DRIVEN MODEL CONSTRUCTION FOR INDUSTRIAL ASSET DECISION BOUNDARY CLASSIFICATION

(71) Applicant: General Electric Company, Schenectady, NY (US)

(72) Inventors: Masoud Abbaszadeh, Clifton Park, NY (US); Lalit Keshav Mestha, North Colonie, NY (US); Cody Joe Bushey, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/681,974

(22) Filed: Aug. 21, 2017

(65) Prior Publication Data

US 2019/0056722 A1    Feb. 21, 2019

(51) Int. Cl.
| | |
|---|---|
| *G06F 21/55* | (2013.01) |
| *G05B 19/418* | (2006.01) |
| *G06F 21/60* | (2013.01) |
| *G06F 21/56* | (2013.01) |
| *H04L 29/06* | (2006.01) |

(52) U.S. Cl.
CPC ....... *G05B 19/41885* (2013.01); *G06F 21/55* (2013.01); *G06F 21/566* (2013.01);
(Continued)

(58) Field of Classification Search
CPC ......... H04L 63/14; H04L 29/06; G06F 21/55; G06F 21/56
See application file for complete search history.

(56) References Cited

U.S. PATENT DOCUMENTS

| 7,792,770 B1 | 9/2010 | Phoha et al. |
| 2008/0201278 A1 | 8/2008 | Muller et al. |
| | (Continued) | |

FOREIGN PATENT DOCUMENTS

| WO | 2016125133 A1 | 8/2016 | |
| WO | WO-2018044410 A1 * | 3/2018 | ........... G06F 21/566 |

OTHER PUBLICATIONS

Kelic, Andjelka et al., "Decision Framework for Evaluating the Macroeconomic Risks and Plicy Impacts of Cyber Attacks", Environment Systems and Decisions, vol. 33, Issue 4, Dec. 2013, DOI 10.1007/s10669-013-9479-9, (pp. 545-560, 17 total pages), https://link.springer.com/article/10.1007/s10669-013-9479-9.
(Continued)

*Primary Examiner* — Izunna Okeke
(74) *Attorney, Agent, or Firm* — Buckley, Maschoff & Talwalkar LLC

(57) ABSTRACT

In some embodiments, a system model construction platform may receive, from a system node data store, system node data associated with an industrial asset. The system model construction platform may automatically construct a data-driven, dynamic system model for the industrial asset based on the received system node data. A synthetic attack platform may then inject at least one synthetic attack into the data-driven, dynamic system model to create, for each of a plurality of monitoring nodes, a series of synthetic attack monitoring node values over time that represent simulated attacked operation of the industrial asset. The synthetic attack platform may store, in a synthetic attack space data source, the series of synthetic attack monitoring node values over time that represent simulated attacked operation of the industrial asset. This information may then be used, for example, along with normal operational data to construct a threat detection model for the industrial asset.

22 Claims, 21 Drawing Sheets

(52) U.S. Cl.
CPC ........ *G06F 21/604* (2013.01); *H04L 63/1408* (2013.01); *H04L 63/1433* (2013.01); *G05B 2219/35269* (2013.01); *G05B 2219/36546* (2013.01); *G06F 2221/034* (2013.01)

(56) References Cited

U.S. PATENT DOCUMENTS

| | | | |
|---|---|---|---|
| 2009/0204233 A1* | 8/2009 | Zhan | G05B 17/02 700/29 |
| 2013/0132149 A1 | 5/2013 | Wei et al. | |
| 2015/0281278 A1 | 10/2015 | Gooding et al. | |

OTHER PUBLICATIONS

Hurst, William et al., "Behaviour Analysis Techniques for Supporting Critical Infrastructure Security", International Journal of Critical Infrastructures, vol. 10, Issue 3-4, 2014, (pp. 267-287, 21 total pages), http://www.inderscienceonline.com/doi/abs/10.1504/IJCIS.2014.066358, 2015.

Cook, Allan et al., "Measuring the Risk of Cyber Attack in Industrial Control Systems", School of Computer Science and Informatics, Aug. 23-25, 2016, (pp. 103-113, 11 total pages), DOI: 10.14236/ewic/ICS2016.12, https://www.dora.dmu.ac.uk/handle/2086/13839,.

Ambusaidi, Mohammed A. et al., "Building an Intrusion Detection System Using a Filter-Based Feature Selection Algorithm", IEEE Transactions on Computers, vol. 65, Issue 10, Oct. 1, 2016, DOI: 10.1109/TC.2016.2519914, (pp. 2986-2998, 13 total pages).

Bernieri, Giuseppe et al., "A Multiple-Criteria Decision Making Method as Support for Critical Infrastructure Protection and Intrusion Detection System", 42nd Annual Conference of the IEEE Industrial Electronics Society IECON, Oct. 23-26, 2016, (pp. 4871-4876, 6 total pages), http://ieeexplore.ieee.org/document/7793111/.

* cited by examiner

| INDUSTRIAL ASSET IDENTIFIER 1902 | INDUSTRIAL ASSET DESCRIPTION 1904 | MODEL IDENTIFIER 1906 | MODEL TYPE 1908 | ORDER 1910 | INPUT/OUTPUT CHANNELS 1912 |
|---|---|---|---|---|---|
| IA_2001 | GAS TURBINE | DDM_01 | K | 10 | 6/5 |
| IA_2001 | GAS TURBINE | DDM_02 | C | 5 | 5/2 |
| IA_2001 | GAS TURBINE | DDM_03 | P | 10 | 2/6 |
| IA_2002 | ELECTRIC POWER GRID | DDM_04 | P | 10 | 25/5 |

Table 2010:

| # | N | A |
|---|-----|-----|
| N | 500 | 25  |
| A | 5   | 450 |

PREDICTED CLASS / ACTUAL CLASS

Table 2020:

| % | N  | A  |
|---|----|----|
| N | 99 | .6 |
| A | 5  | 95 |

PREDICTED CLASS / ACTUAL CLASS

DATA-DRIVEN MODEL CONSTRUCTION FOR INDUSTRIAL ASSET DECISION BOUNDARY CLASSIFICATION

This invention was made with Government support under contract number DEOE0000833 awarded by the Department of Energy. The Government has certain right in this invention.

BACKGROUND

Industrial control systems that operate physical systems (e.g., associated with power turbines, jet engines, locomotives, autonomous vehicles, etc.) are increasingly connected to the Internet. As a result, these control systems have been increasingly vulnerable to threats, such as cyber-attacks (e.g., associated with a computer virus, malicious software, etc.), that could disrupt electric power generation and distribution, damage engines, inflict vehicle malfunctions, etc. Current methods primarily consider attack detection in Information Technology ("IT," such as, computers that store, retrieve, transmit, manipulate data) and Operation Technology ("OT," such as direct monitoring devices and communication bus interfaces). Cyber-attacks can still penetrate through these protection layers and reach the physical "domain" as seen in 2010 with the Stuxnet attack. Such attacks can diminish the performance of a control system and may cause total shut down or catastrophic damage to a plant. Currently, no methods are available to automatically detect, during a cyber-incident, attacks at the domain layer where sensors, controllers, and actuators are located. In some cases, multiple attacks may occur simultaneously (e.g., more than one actuator, sensor, or parameter inside control system devices might be altered maliciously by an unauthorized party at the same time). Note that some subtle consequences of cyber-attacks, such as stealthy attacks occurring at the domain layer, might not be readily detectable (e.g., when only one monitoring node, such as a sensor node, is used in a detection algorithm). Existing approaches to protect an industrial control system, such as failure and diagnostics technologies, may not adequately address these problems—especially when multiple, simultaneous attacks occur since such multiple faults/failure diagnostic technologies are not designed for detecting stealthy attacks in an automatic manner.

Note that high-fidelity physics models (which could help detect cyber-attacks) might not be available for older industrial assets and/or assets produced by a wide variety of manufacturers. Moreover, creating such physics-based models can be a time-consuming and error prone process. It would therefore be desirable to protect an industrial asset from cyber-attacks in an automatic and accurate manner even when high fidelity, physics-based models of an asset are not available.

SUMMARY

According to some embodiments, a system to protect an industrial asset from cyber-attacks may include monitoring nodes (also referred to as "threat points"). Monitoring nodes might be signals from critical sensors, controller nodes, actuators, and/or key software nodes to be used to monitor occurrences of cyber-threats or attacks. A normal space data source may store data, for each of a plurality of monitoring nodes (e.g., sensor nodes, actuator nodes, controller nodes, software nodes, etc.), a series of normal values (also referred to as a "data stream") from monitoring nodes that represent normal operation of an industrial asset. In some embodiments, a system model construction platform may receive, from a system node data store, system node data associated with an industrial asset. The system model construction platform may automatically construct a data-driven, dynamic system model for the industrial asset based on the received system node data. A synthetic attack platform may then inject at least one synthetic attack into the data-driven, dynamic system model to create, for each of a plurality of monitoring nodes, a series of synthetic attack monitoring node values over time that represent simulated attacked operation of the industrial asset. The synthetic attack platform may store, in a synthetic attack space data source, the series of synthetic attack monitoring node values over time that represent simulated attacked operation of the industrial asset. This information may then be used, for example, along with normal operational data to construct a threat detection model for the industrial asset.

Some embodiments comprise: means for receiving, at a system model construction platform from a system node data store, system node data associated with the industrial asset; means for automatically constructing, by the system model construction platform, a data-driven, dynamic system model for the industrial asset based on the received system node data; means for injecting, by a synthetic attack platform, at least one synthetic attack into the data-driven, dynamic system model to create, for each of a plurality of monitoring nodes, a series of synthetic attack monitoring node values over time that represent simulated attacked operation of the industrial asset; and means for storing, by the synthetic attack platform in a synthetic attack space data source, for each of the plurality of monitoring nodes, the series of synthetic attack monitoring node values over time that represent simulated attacked operation of the industrial asset.

Some technical advantages of some embodiments disclosed herein are improved systems and methods to protect an industrial asset from cyber-attacks in an automatic and accurate manner.

BRIEF DESCRIPTION OF THE DRAWINGS

FIG. 19 is a tabular portion of a data-driven model database in accordance with some embodiments.

FIG. 20 illustrates results according to some embodiments.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

Figure 1:
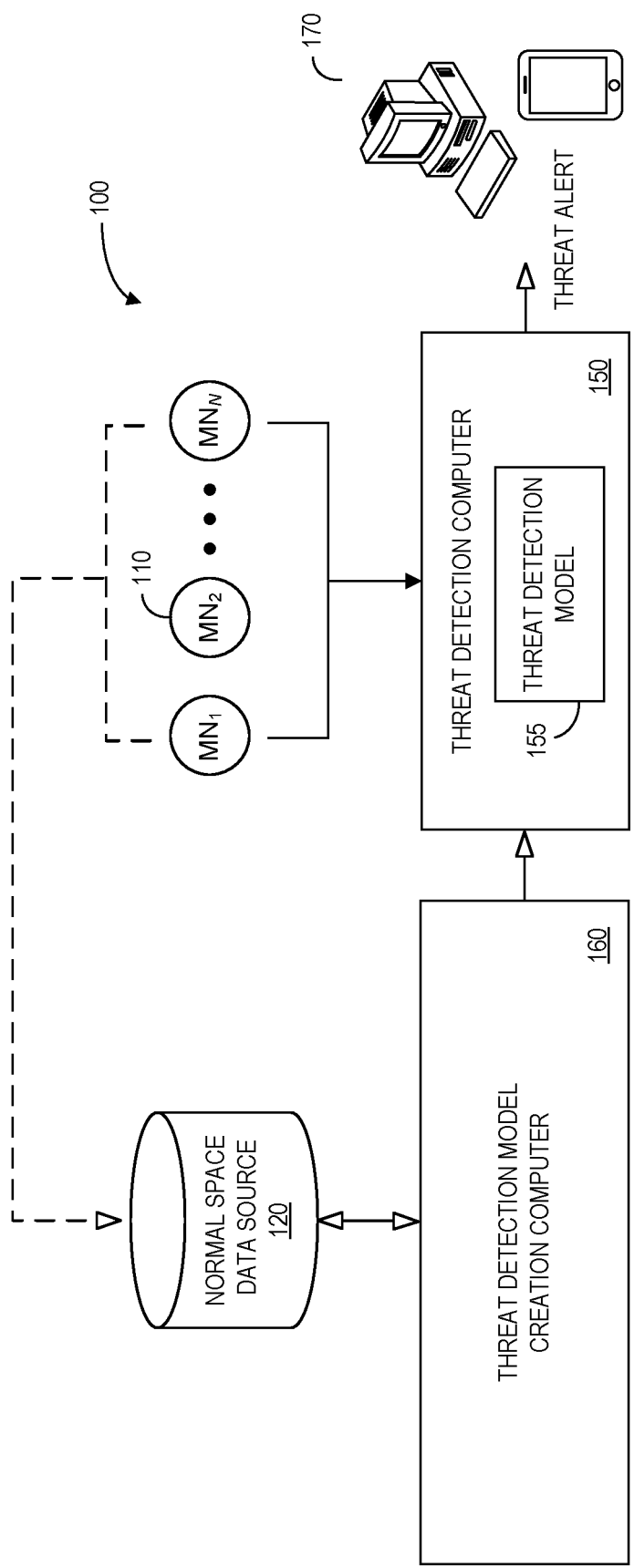
FIG. 1 is a high-level block diagram of a system to protect an industrial asset.

Industrial control systems that operate physical systems are increasingly connected to the Internet. Note that, as used herein, the term "industrial" might be associated with any system that is connected to an external source, such as the Internet in the case of a cyber-physical system or locally operating an air-gapped physical system. As a result, these control systems have been increasingly vulnerable to threats and, in some cases, multiple attacks may occur simultaneously. Protecting an asset may depend on detecting such attacks as well as naturally occurring faults and failures. Existing approaches to protect an industrial control system, such as failure and diagnostics technologies, may not adequately address these threats—especially when multiple, simultaneous attacks occur. It would therefore be desirable to protect an industrial asset from cyber threats in an automatic and accurate manner. FIG. 1 is a high-level architecture of a system 100 that might be used to protect an asset. The system 100 may include a "normal space" data source 120 storing, for each of a plurality of monitoring nodes 110, a series of normal values over time that represent normal operation of an industrial asset (e.g., collected from actual monitoring node 110 data as illustrated by the dashed line in FIG. 1).

Information from the normal space data source 120 may be provided to a threat detection model creation computer 160 that uses this data to create a decision boundary (that is, a boundary that separates normal behavior from abnormal behavior). The decision boundary may then be used by a threat detection computer 150 executing a threat detection model 155. The threat detection model 155 may, for example, monitor streams of data from the monitoring nodes 110 comprising data from sensor nodes, actuator nodes, and/or any other critical monitoring nodes (e.g., monitoring nodes $MN_1$ through $MN_N$) and automatically output a threat alert (e.g., indicating that operation of the industrial asset is normal or abnormal) to one or more remote monitoring devices 170 when appropriate (e.g., for display to a user). As used herein, the term "automatically" may refer to, for example, actions that can be performed with little or no human intervention. According to some embodiments, information about detected attack or fault may be transmitted back to an industrial control system.

As used herein, devices, including those associated with the system 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The threat detection model creation computer 160 may store information into and/or retrieve information from various data stores, such as the normal space data source 120. The various data sources may be locally stored or reside remote from the threat detection model creation computer 160. Although a single threat detection model creation computer 160 is shown in FIG. 1, any number of such devices may be included. Moreover, various devices described herein might be combined according to embodiments of the present invention. For example, in some embodiments, the threat detection model creation computer 160 and normal space data source 120 might comprise a single apparatus. The threat detection model creation computer 160 and or threat detection computer 150 functions may be performed by a constellation of networked apparatuses, in a distributed processing or cloud-based architecture.

A user may access the system 100 via one of the monitoring devices 170 (e.g., a Personal Computer ("PC"), tablet, or smartphone) to view information about and/or manage attack and system information in accordance with any of the embodiments described herein. In some cases, an interactive graphical display interface may let a user define and/or adjust certain parameters (e.g., attack detection trigger levels or model configurations) and/or provide or receive automatically generated recommendations or results from the threat detection model creation computer 160 and/or the threat detection computer 150.

Figure 2:
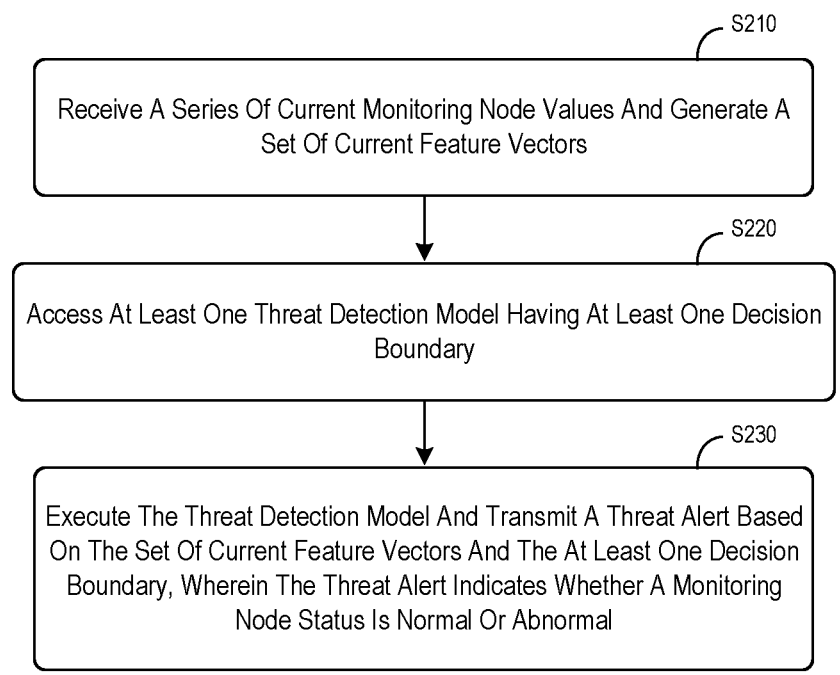
FIG. 2 is an industrial asset protection method.

The decision boundary associated with the threat detection model can be used to detect cyber-attacks. For example, FIG. 2 is an industrial asset protection method that might be implemented. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, the system may receive, from a plurality of monitoring nodes, a series of current values over time that represent a current operation of an industrial asset. The system may also generate, based on the received series of current values, a set of current feature vectors. At S220, a threat detection model may be accessed including at least one decision boundary. At S230, the model may be executed and a threat alert may be transmitted based on the set of current feature vectors and the decision boundary when appropriate (e.g., when a cyber-attack is detected). According to some embodiments, one or more response actions may be performed when a threat alert is transmitted. For example, the system might automatically shut down all or a portion of the industrial asset (e.g., to let the detected potential cyber-attack be further investigated). As other examples, one or more parameters might be automatically modified, a software application might be automatically triggered to capture data and/or isolate possible causes, etc.

When available, a system may take advantage of the physics of an industrial asset by learning a priori from tuned high fidelity equipment models and/or actual "on the job" data to detect single or multiple simultaneous adversarial threats to the system. Moreover, monitoring node data may be converted to features using advanced feature-based methods, and the real-time operation of the control system may be monitoring in substantially real-time. Abnormalities may be detected by classifying the monitored data as being "normal" or "abnormal" (e.g., "attacked"). This decision boundary may be constructed in feature space using dynamic models and may help enable early detection of vulnerabilities (and potentially avert catastrophic failures) allowing an operator to restore the control system to normal operation in a timely fashion. Note, however, that in many cases a physics-based model of an industrial asset might not be readily available.

Figure 3:
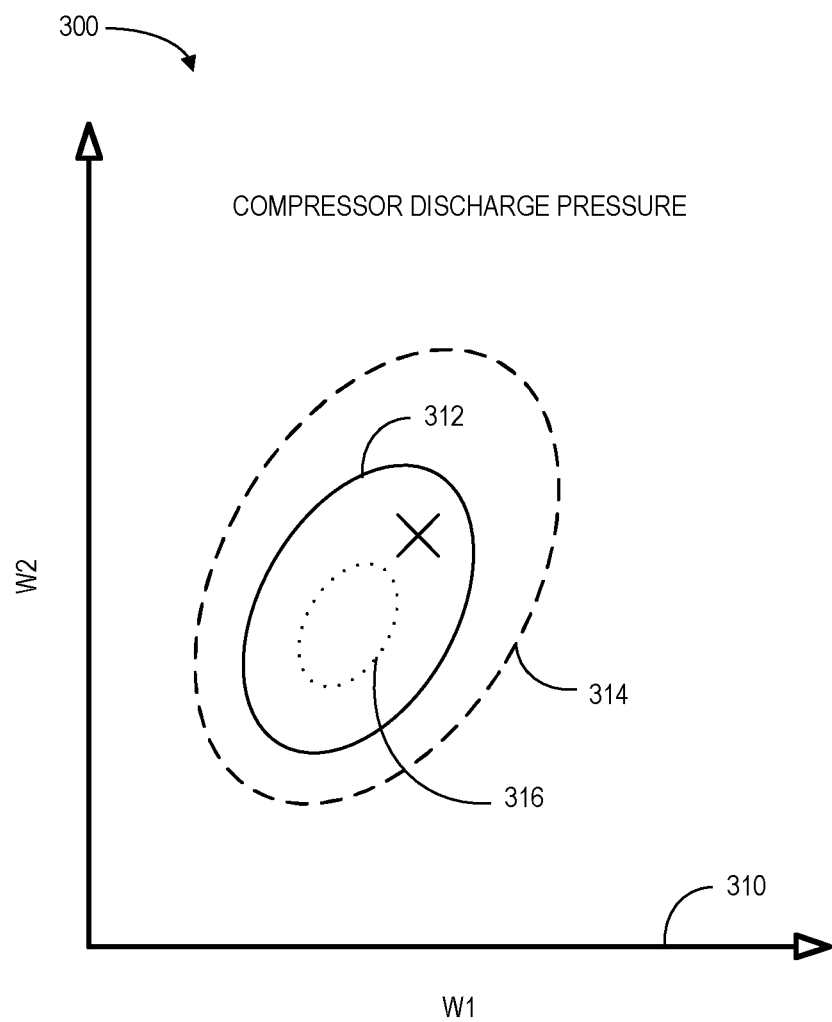
FIGS. 3 and 4 illustrate features, feature vectors, and decision boundaries in accordance with some embodiments.
Figure 4:
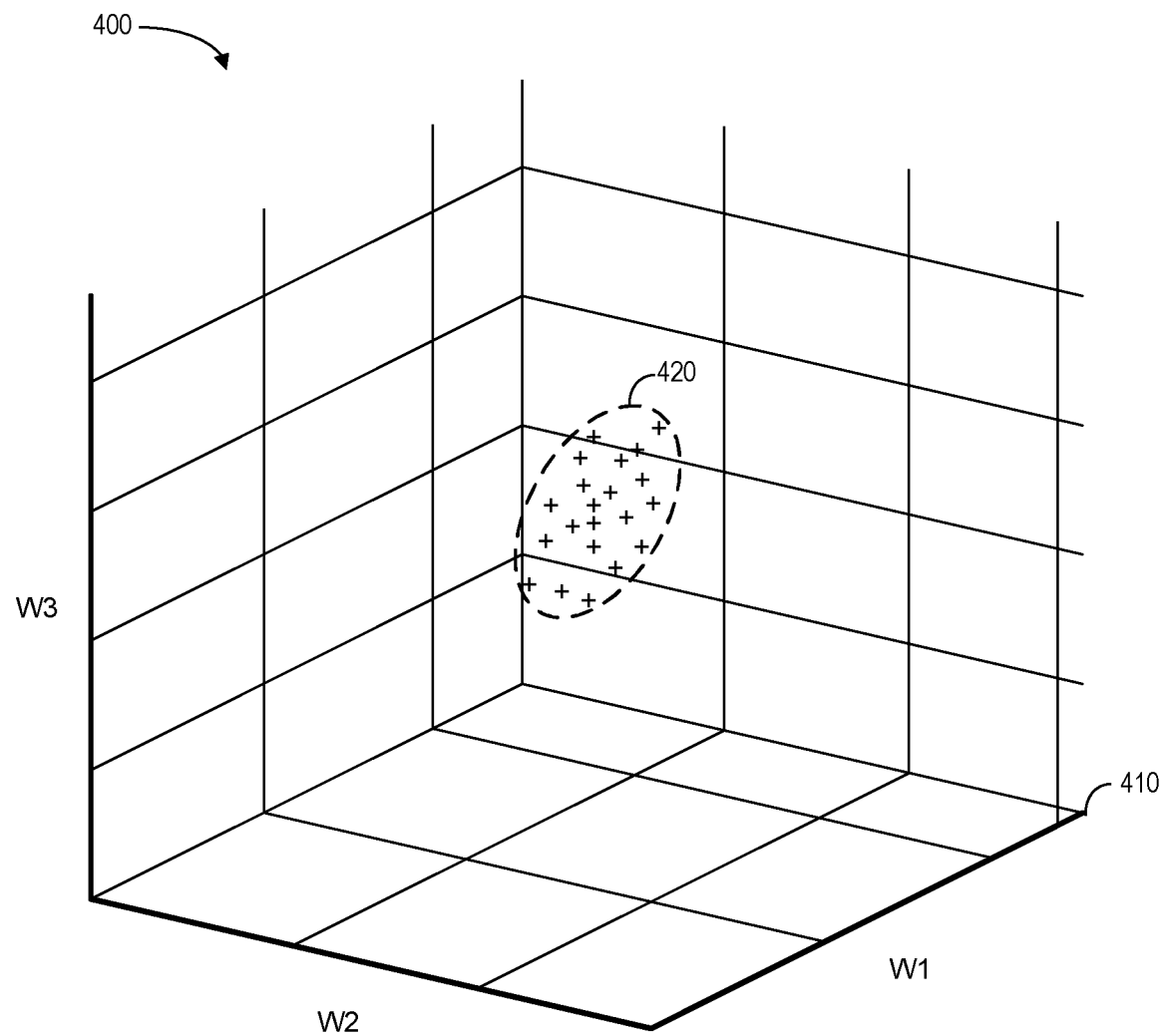

FIGS. 3 and 4 illustrate features, feature vectors, and decision boundaries in accordance with some embodiments. In particular, FIG. 3 illustrates 300 boundaries and feature vectors for a monitoring node parameter in accordance with some embodiments. a graph 310 includes a first axis representing value weight 1 ("w1"), a feature 1, and a second axis representing value weight 2 ("w2"), a feature 2. Values for w1 and w2 might be associated with, for example, outputs from a Principal Component Analysis ("PCA") performed on input data. PCA might be one of the features that might be used by the algorithm to characterize the data, but note that other features could be leveraged. The graph 310 illustrated in FIG. 3 represents compressor discharge temperature 310 for a gas turbine but other values might be monitored instead (e.g., compressor pressure ratio, compressor inlet temperature, fuel flow, generator power, gas turbine exhaust temperature, etc.). The graph 310 includes an average boundary 312 (solid line), minimum boundary 314 (dotted line), and maximum boundary 316 (dashed line) and an indication associated with current feature location for the monitoring node parameter (illustrated with an "X" on the graph 310). As illustrated in FIG. 3, the current monitoring node location is between the minimum and maximum boundaries (that is, the "X" is between the dotted and dashed lines). As a result, the system may determine that the operation of the industrial asset is normal (and no attack or fault is being detected for that monitoring node).

FIG. 4 illustrates 400 three dimensions of threat node outputs in accordance with some embodiments. In particular, a graph 410 plots monitoring node outputs during normal operation ("+") in three dimensions, such as dimensions associated with PCA: w1, w2, and w3. Moreover, the graph 410 includes a dashed line indication of a normal operating space decision boundary 420. Note that because the boundary 420 was constructed using only normal space data ("+") (and no attack data), it might be closely tied to the normal outputs. As a result, even a small deviation from normal outputs in the future might result in a "false positive" threat alert.

Note that an appropriate set of multi-dimensional feature vectors, which may be extracted automatically (e.g., via an algorithm) and/or be manually input, might comprise a good predictor of measured data in a low dimensional vector space. According to some embodiments, appropriate decision boundaries may be constructed in a multi-dimensional space using a data set which is obtained via scientific principles associated with Design of Experiments ("DoE") techniques. Moreover, multiple algorithmic methods (e.g., support vector machines or machine learning techniques) may be used to generate decision boundaries. Since boundaries may be driven by measured data, defined boundary margins may help to create a threat zone in a multi-dimensional feature space. Moreover, the margins may be dynamic in nature and adapted based on a transient or steady state model of the equipment and/or be obtained while operating the system as in self-learning systems from the incoming data stream. According to some embodiments, a training method may be used for supervised learning to teach decision boundaries. This type of supervised learning may take into account an operator's knowledge about system operation (e.g., the differences between normal and abnormal operation).

Figure 5:
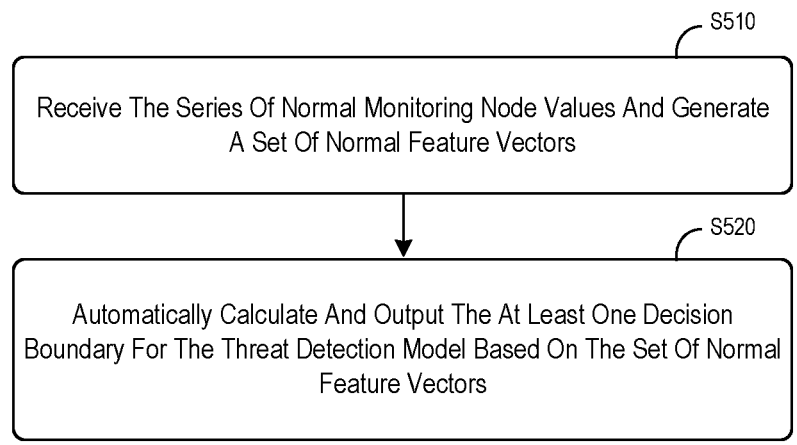
FIG. 5 is a threat detection model creation method.

FIG. 5 illustrates a model creation method that might be performed by some or all of the elements of the system 100 described with respect to FIG. 1. At S510, the system may retrieve, for each of a plurality of monitoring nodes, a series of normal values over time that represent normal operation of the industrial asset and a set of normal feature vectors may be generated. The series of normal values might be obtained, for example, by running DoE on an industrial control system associated with a power turbine, a jet engine, a locomotive, an autonomous vehicle, etc. At S520, a decision boundary may be automatically calculated and output for a threat detection model based on the sets of normal feature vectors. According to some embodiments, the decision boundary might be associated with a line, a hyperplane, a non-linear boundary separating normal space from attacked space, and/or a plurality of decision boundaries. In addition, note that the threat detection model might be associated with the decision boundary, feature mapping functions, and/or feature parameters.

Thus, a system may classify the status of an industrial control system having a plurality of monitoring nodes (including sensor, actuator, and controller nodes) as being normal or under a cyber-attack. This may enable tailored, resilient, and fault-tolerant control remedies against cyber-attacks and faults.

According to some embodiments, time-series data may be received from a collection of monitoring nodes (e.g., sensor, actuator, and/or controller nodes). Features may then be extracted from the time series data for each monitoring node. The term "feature" may refer to, for example, mathematical characterizations of data. Examples of features as applied to data might include the maximum and minimum, mean, standard deviation, variance, settling time, Fast Fourier Transform ("FFT") spectral components, linear and non-linear principal components, independent components, sparse coding, deep learning, etc. The type and number of features for each monitoring node, might be optimized using domain-knowledge, feature engineering, or ROC statistics. The local features for each monitoring node may be stacked to create the global feature vector. The global feature vector may also contain interactive feature involving two or more monitoring nodes, e.g. cross-correlation between two nodes. According to some embodiments, the features may be normalized and the dimension of the global feature vector can then be further reduced using any dimensionality reduction technic such as PCA. Note that the features may be calculated over a sliding window of the signal time series and the length of the window (and the duration of slide) may be determined from domain knowledge and inspection of the data or using batch processing.

Note that many different types of features may be utilized in accordance with any of the embodiments described herein, including principal components (weights constructed with natural basis sets) and statistical features (e.g., mean, variance, skewness, kurtosis, maximum, minimum values of time series signals, location of maximum and minimum values, independent components, etc.). Other examples include deep learning features (e.g., generated by mining experimental and/or historical data sets) and frequency domain features (e.g., associated with coefficients of Fourier or wavelet transforms). Embodiments may also be associated with time series analysis features, such as cross-correlations, auto-correlations, orders of the autoregressive, moving average model, parameters of the model, derivatives and integrals of signals, rise time, settling time, neural networks, etc. Still other examples include logical features (with semantic abstractions such as "yes" and "no"), geographic/position locations, and interaction features (mathematical combinations of signals from multiple monitoring nodes and specific locations). Embodiments may incorporate any number of features, with more features allowing the approach to become more accurate as the system learns more about the physical process and threat. According to some embodiments, dissimilar values from monitoring nodes may be normalized to unit-less space, which may allow for a simple way to compare outputs and strength of outputs.

Note that PCA information may be represented as weights in reduced dimensions. For example, data from each monitoring node may be converted to low dimensional features (e.g., weights). According to some embodiments, monitoring node data is normalized as follows:

$$S_{normalized}(k) = \frac{S_{nominal}(k) - S_{original}(k)}{\overline{S}_{nominal}}$$

where S stands for a monitoring node quantity at "k" instant of time. Moreover, the output may then be expressed as a weighted linear combination of basis functions as follows:

$$S = S_0 + \sum_{j=1}^{N} w_j \Psi_j$$

where $S_0$ is the average monitoring node output with all threats, $w_j$ is the $j^{th}$ weight, and $\Psi_j$ is the $j^{th}$ basis vector. According to some embodiments, natural basis vectors are obtained using a covariance of the monitoring nodes' data matrix. Once the basis vectors are known, the weight may be found using the following equation (assuming that the basis sets are orthogonal):

$$w_j = (S-S_0)^T \Psi_j$$

Note that weights may be an example of features used in a feature vector.

Thus, once the observed quantities from monitoring nodes are expressed in terms of feature vectors (e.g., with many features), the feature vectors may then be used as points in a multi-dimensional feature space. During real-time threat detection, decisions may be made by comparing where each point falls with respect to a decision boundary that separates the space between two regions (or spaces): abnormal ("attack") space and normal operating space. If the point falls in the attack space, the industrial asset is undergoing an abnormal operation such as during a cyber-attack. If the point falls in the normal operating space, the industrial asset is not undergoing an abnormal operation such as during a cyber-attack. Appropriate decision zone with boundaries is constructed using data sets as described herein with high fidelity models. For example, support vector machines may be used with a kernel function to construct a decision boundary. According to some embodiments, deep learning techniques may also be used to construct decision boundaries.

Figure 6:
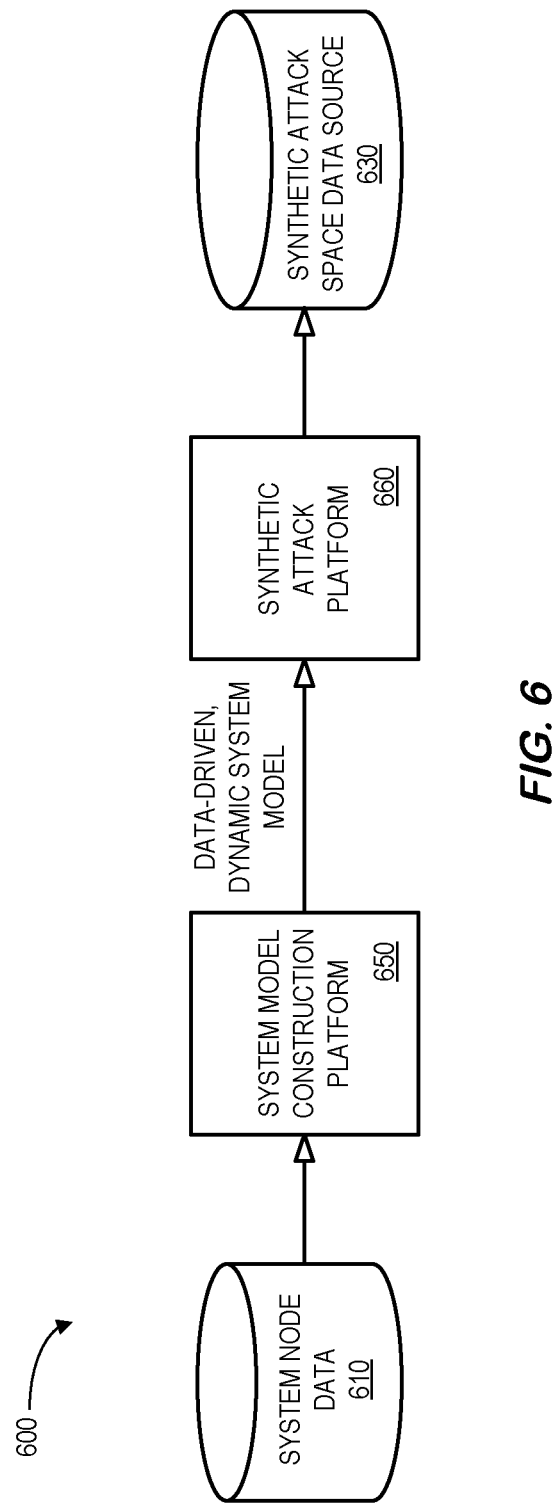
FIG. 6 is a high-level block diagram of a system in accordance with some embodiments.

If attack space data could be used (in addition to the normal space data) to create a decision boundary for a threat detection model the accuracy of the model might be improved. In many cases, however, such attack space data is not available and there is no physics-based model that can be used to simulate cyber-attack results. Thus, FIG. 6 is a high-level block diagram of a system 600 in accordance with some embodiments. The system includes a system node data store 610 that contains system node data associated with an industrial asset (e.g., a description of each node, data values collected for each node, how nodes are connected or interrelated, etc.). The system 600 also includes a system model construction platform 650, coupled to the system node data store, to receive the system node data associated with the industrial asset and to automatically construct a data-driven, dynamic system model for the industrial asset based on the received system node data. The data-driven, dynamic system model may then be provided to a synthetic attack platform 660 that injects at least one synthetic attack into the data-driven, dynamic system model to create, for each of a plurality of monitoring nodes, a series of synthetic attack monitoring node values over time that represent simulated attacked operation of the industrial asset. These values may then be stored in a synthetic attack space data source 630 (e.g., to be used along with normal space data to create an appropriate decision boundary for a threat detection model).

Figure 7:
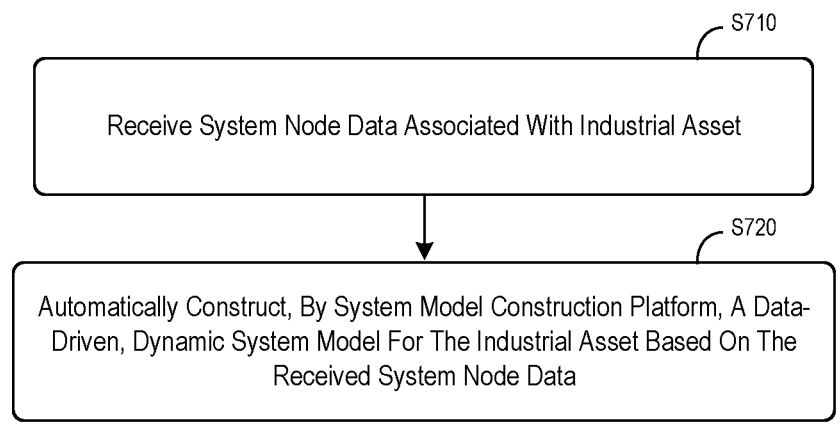
FIG. 7 is a data-driven model creation method according to some embodiments.

FIG. 7 is a data-driven model creation method according to some embodiments. At S710, the system may receive system node data associated with the industrial asset. At S720, the system may automatically construct a data-driven, dynamic system model for the industrial asset based on the received system node data. According to some embodiments, the data-driven, dynamic system model is built in state-space and using one of black-box and grey-box system identification techniques. Moreover, note that a plurality of data-driven, dynamic system models might be automatically constructed and at least one of the data-driven, dynamic system models might be associated with a plant model of the industrial asset, a controller model of the industrial asset, and/or a sub-controller model of the industrial asset.

According to some embodiments, the data-driven, dynamic system model is associated with a linear or non-linear model. Moreover, the data-driven, dynamic system model might be associated with an order that was automatically selected by the system model construction platform (e.g., via a Hankel norm analysis). According to some embodiments, parameters of the data-driven, dynamic system model are estimated via a system identification method associated with Prediction Error ("PE") minimization, subspace methods, Subspace State Space System Identification ("N4SID"), and/or Eigen-system Realization Algorithm ("ERA") techniques. Note that the data-driven, dynamic system model might be associated with, for example, a Single-Input, Single-Output ("SISO") model, a Single-Input, Multi-Output ("SIMO") model, a Multi-Input, Single-Output ("MISO") model, and/or a Multi-Input, Multi-Output ("MIMO") model.

Figure 8:
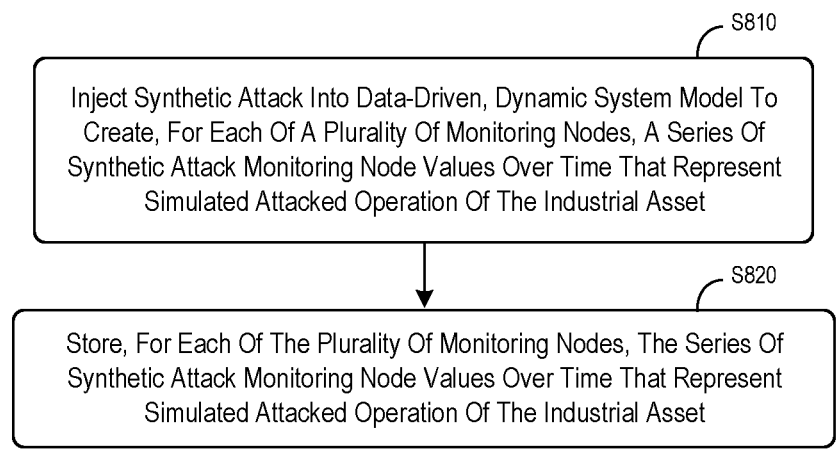
FIG. 8 is a synthetic attack injection method in accordance with some embodiments.

FIG. 8 is a synthetic attack injection method in accordance with some embodiments. At S810, at least one synthetic attack may be injected into the data-driven, dynamic system model to create, for each of a plurality of monitoring nodes, a series of synthetic attack monitoring node values over time that represent simulated attacked operation of the industrial asset. At S820, the system may store, for each of the plurality of monitoring nodes, the series of synthetic attack monitoring node values over time that represent simulated attacked operation of the industrial asset.

Figure 9:
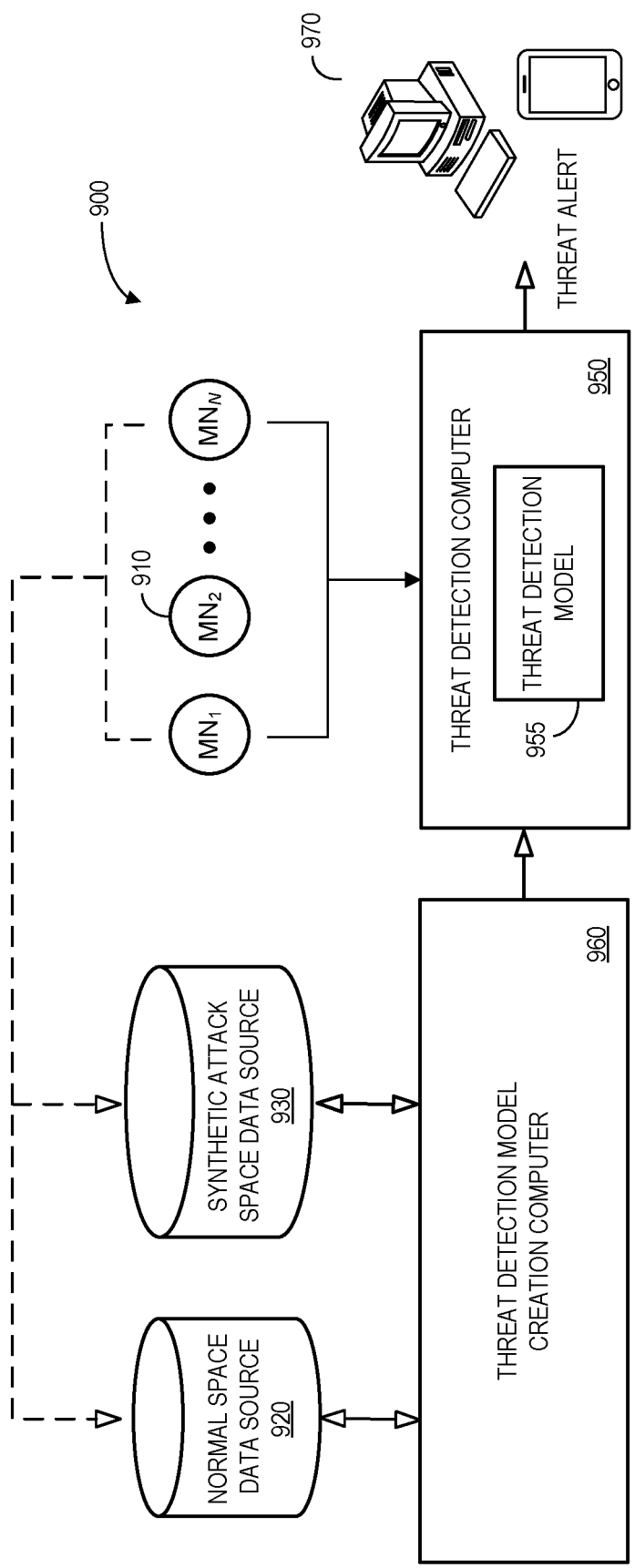
FIG. 9 is a high-level block diagram of a system to protect an industrial asset according to some embodiments.

The synthetic attack monitoring node values can then be used to improve the operation of the system 100 described with respect to FIG. 1. For example, FIG. 9 is a high-level architecture of a system 900 in accordance with some embodiments. The system 900 may include a "normal space" data source 920 and a "synthetic attack space" data source 930. The normal space data source 920 might store, for each of a plurality of monitoring nodes 910, a series of normal values over time that represent normal operation of an industrial asset (e.g., collected from actual monitoring node 910 data as illustrated by the dashed line in FIG. 9). The synthetic attack space data source 930 might store, for each of the monitoring nodes 910, a series of attacked values that represent a simulated attacked operation of the industrial asset (e.g., based on data-driven models).

Information from the normal space data source 920 and the synthetic attack space data source 930 may be provided to a threat detection model creation computer 960 that uses this data to create a decision boundary (that is, a boundary that separates normal behavior from abnormal or attacked behavior). The decision boundary may then be used by a threat detection computer 950 executing a threat detection model 955. The threat detection model 955 may, for example, monitor streams of data from the monitoring nodes 910 comprising data from sensor nodes, actuator nodes, and/or any other critical monitoring nodes (e.g., monitoring nodes $MN_1$ through $MN_N$) and automatically output a threat alert (e.g., indicating that operation of the industrial asset is normal or attacked) to one or more remote monitoring devices 970 when appropriate (e.g., for display to a user).

Figure 10:
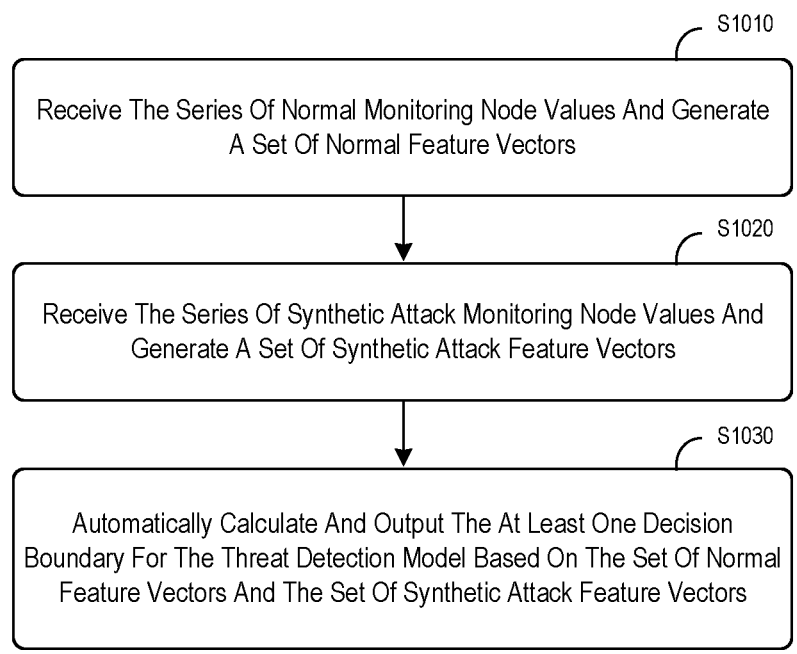
FIG. 10 illustrates an off-line training process in accordance with some embodiments.

FIG. 10 illustrates a model creation method that might be performed by some or all of the elements of the system 900 described with respect to FIG. 9. At S1010, the system may retrieve, for each of a plurality of monitoring nodes, a series of normal values over time that represent normal operation of the industrial asset and a set of normal feature vectors may be generated. At S1020 the system may retrieve, for each of the plurality of monitoring nodes, a series of synthetic attack values over time that represent attacked operation of the industrial asset and a set of attacked feature vectors may be generated. At S1030, a decision boundary may be automatically calculated and output for a threat detection model based on the sets of normal feature vectors, attacked feature vectors, and fault feature vectors. According to some embodiments, the decision boundary might be associated with a line, a hyperplane, a non-linear boundary separating normal space from attacked space, and/or a plurality of decision boundaries.

Figure 11:
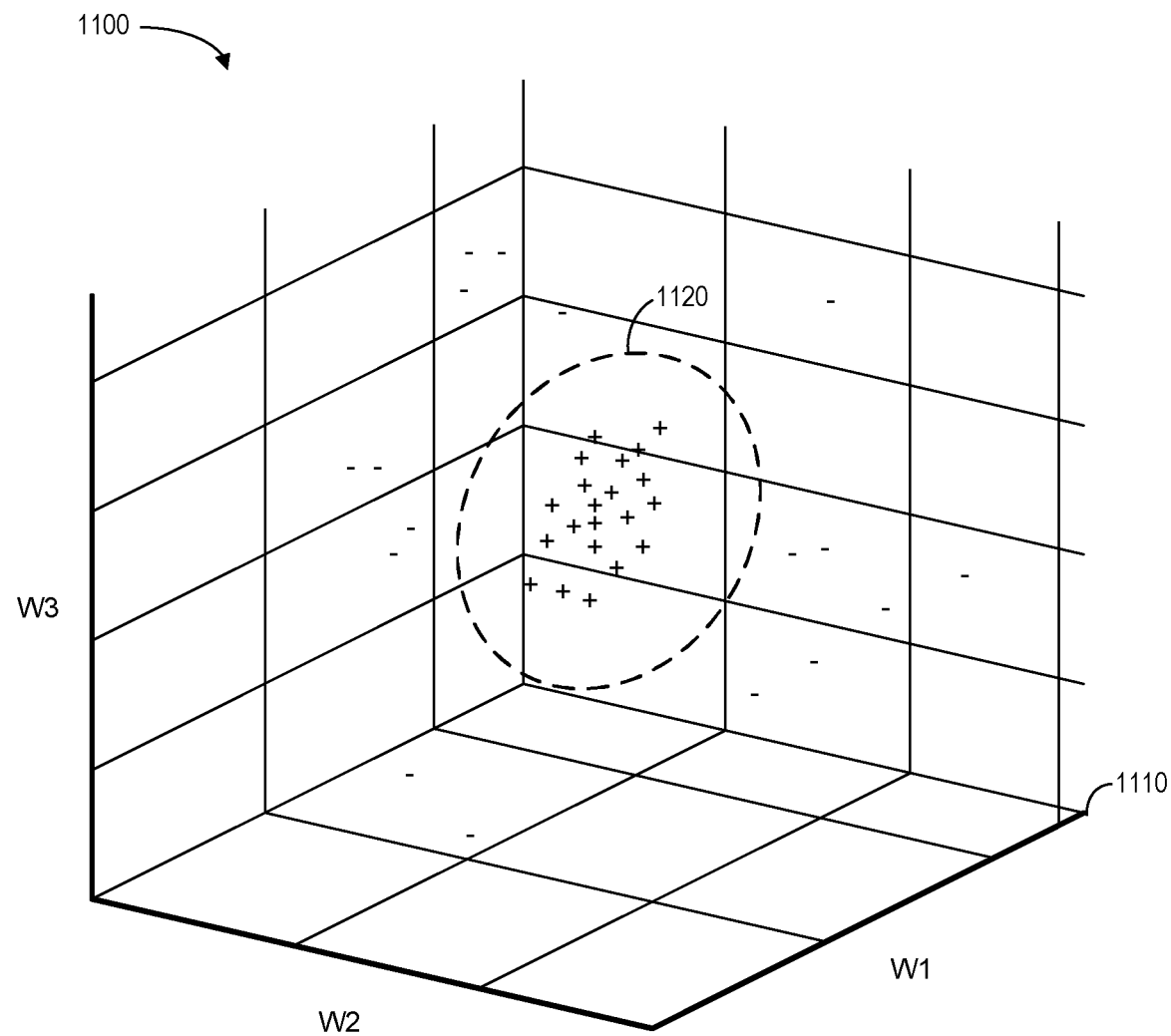
FIG. 11 illustrates features and decision boundaries according to some embodiments.

The addition of synthetic attack space data to the normal space data may improve the quality of decision boundaries. For example, FIG. 11 illustrates 1100 three dimensions of threat node outputs in accordance with some embodiments. In particular, a graph 1110 plots monitoring node outputs during normal operation ("+") and synthetic attack data ("−") in three dimensions, such as dimensions associated with PCA: w1, w2, and w3. Moreover, the graph 1110 includes a dashed line indication of a normal operating space decision boundary 1120. Note that because the boundary 1120 was constructed using both normal space data ("+") and synthetic attack data ("−"), it may be less closely tied to the normal outputs as compared to the example 400 of FIG. 4. As a result, a small deviation from normal outputs in the future might not result in a "false positive" threat alert.

Figure 12:
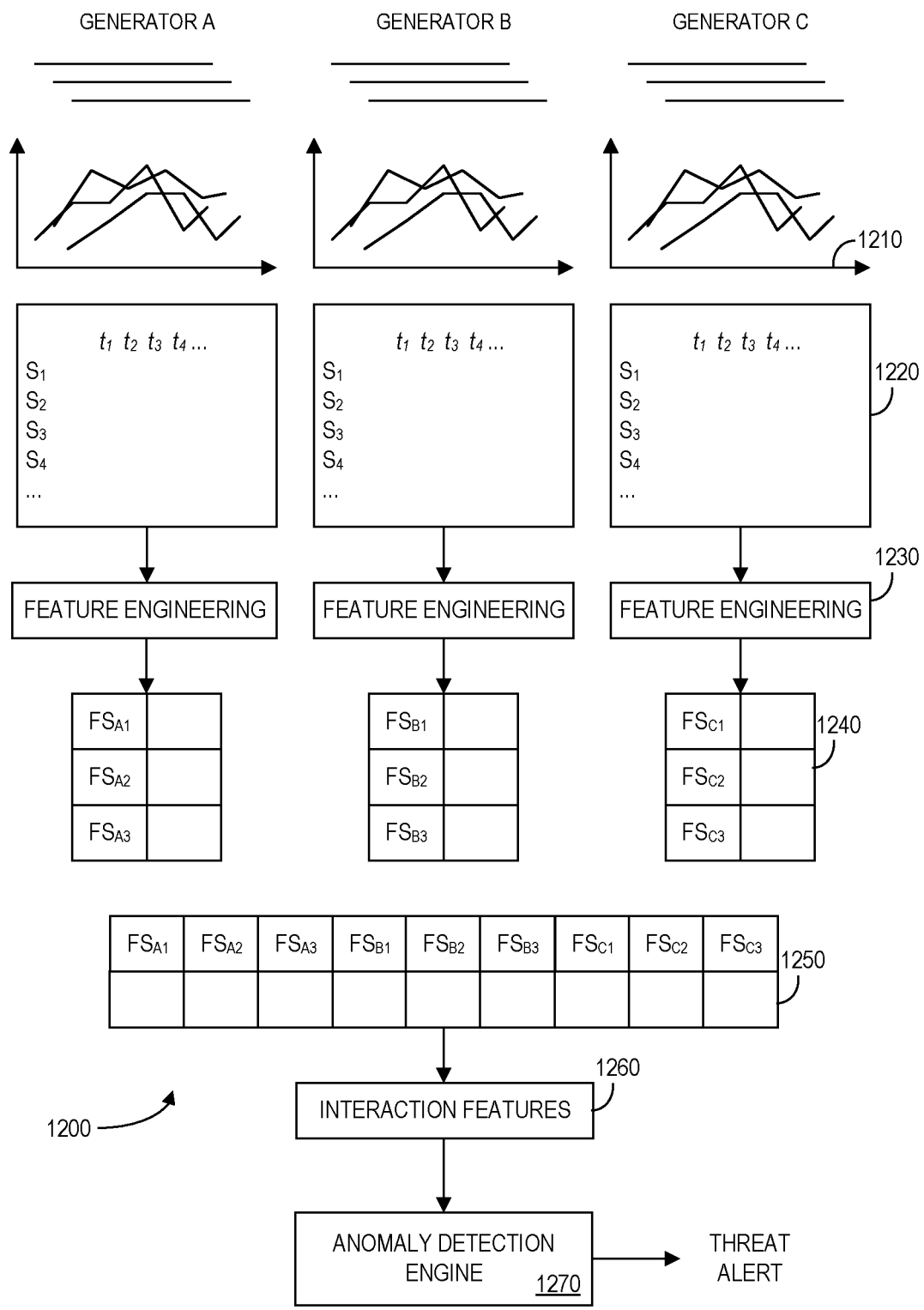
FIG. 12 illustrates global features according to some embodiments.

According to some embodiments, the synthetic attack monitoring node values may be converted into local features (e.g., related to a single node) and/or global features (e.g., associated with the industrial asset as a whole). For example, FIG. 12 is an example of a global threat protection system 1200 in accordance with some embodiments. In particular, the system includes three generators (A, B, and C) and batches of values 1210 from monitoring nodes are collected for each generated over a period of time (e.g., 30 to 50 seconds). According to some embodiments, the batches of values 1210 from monitoring nodes overlap in time. The values 1210 from monitoring nodes may, for example, be stored in a matrix 1220 arranged by time ($t_1$, $t_2$, etc.) and by type of monitoring node ($S_1$, $S_2$, etc.). Feature engineering components 1230 may use information in each matrix 1220 to create a feature vector 1240 for each of the three generators (e.g., the feature vector 1240 for generator C might include $FS_{C1}$, $FS_{C2}$, etc.). The three feature vectors 1240 may then be combined into a single global feature vector 1250 for the system 1200. Interaction features 1260 may be applied (e.g., associated with A*B*C, A+B+C, etc.) and an anomaly detection engine 1270 may compare the result with a decision boundary and output a threat alert when appropriate.

Note that, by way of example only, the industrial asset might be associated with a gas turbine. In this case, the operating conditions might be associated with gas turbine loads and/or gas turbine temperatures. Other gas turbine parameters might include: (i) an operating mode, (ii) an external condition, (iii) a system degradation factor, (iv) fuel input, (v) a turbine inlet temperature, (vi) a turbine inlet pressure, (vii) a turbine power, (viii) a turbine speed, (ix) compressor discharge pressure, (x) compressor discharge temperature, (xi) fuel flow, and/or (xii) turbine exhaust temperature. As another example, the industrial asset might be associated with a computer network and the operating conditions may be associated with information packet transmission characteristics (e.g., packet size, latency, etc.).

Thus, embodiments may provide a system for the construction of decision boundaries for cyber-attack detection in industrial control systems using historical data collected from the asset. Note that embodiments do not rely on the availability of any model of the asset and (thus it may be applicable to any new asset from any manufacturer as long as access to time series data is available). Embodiments may use collected field data for normal operation to reconstruct synthetic data points in the abnormal operating space using feature engineering. Having abnormal operating space may help provide a robust decision boundary (which can be difficult to obtain when access to high fidelity models is not available). According to some embodiments, attacks may be synthesized and injected into sensor, actuator, and/or controller monitoring nodes of data-driven identified plant and controller models. If additional normal data points are needed during boundary computation, embodiments may also synthesize them using the identified models. The classification decision boundary may be trained using the synthetic data in feature space. According to some embodiments, the system is fully reconfigurable and can be applied to fully or partially available data collected from any number of sensor/actuator/controller monitoring nodes. Some embodiments may improve detection accuracy (i.e., reduce false positive and false negative rates) by enabling supervised classification which outperforms semi-supervised classification based on using only normal data.

In many cases, historical data from an asset is available for a given set of monitoring nodes. Monitoring nodes may be some or all sensors, actuators or controller nodes. Note that any combination of these monitoring nodes may be used to develop a data-driven, dynamic system model. Some particular examples of embodiments of the present invention will now be provided. In particular, embodiments might be associated with: (1) dynamic system identification with single or multiple dynamic models, (2) synthetic attack injections, (3) normal and attack data points collection, and (4) decision boundary generation. With respect to dynamic system identification with single/multiple dynamic models, based on the type of the monitoring nodes for which field data is available, different dynamic models may be built to synthesize plant and control system data. According to some embodiments, dynamic models are built in state-space using data-driven (black-box) or grey-box system identification techniques. Note that each dynamic model could be linear or nonlinear based on the fit to the data. The order of the model might, according to some embodiments, be selected automatically using Hankel norm analysis or any other model order selection technique. The parameters of the model may be estimated using any system identification method such as PE, N4SID, ERA, etc.

Figure 13:
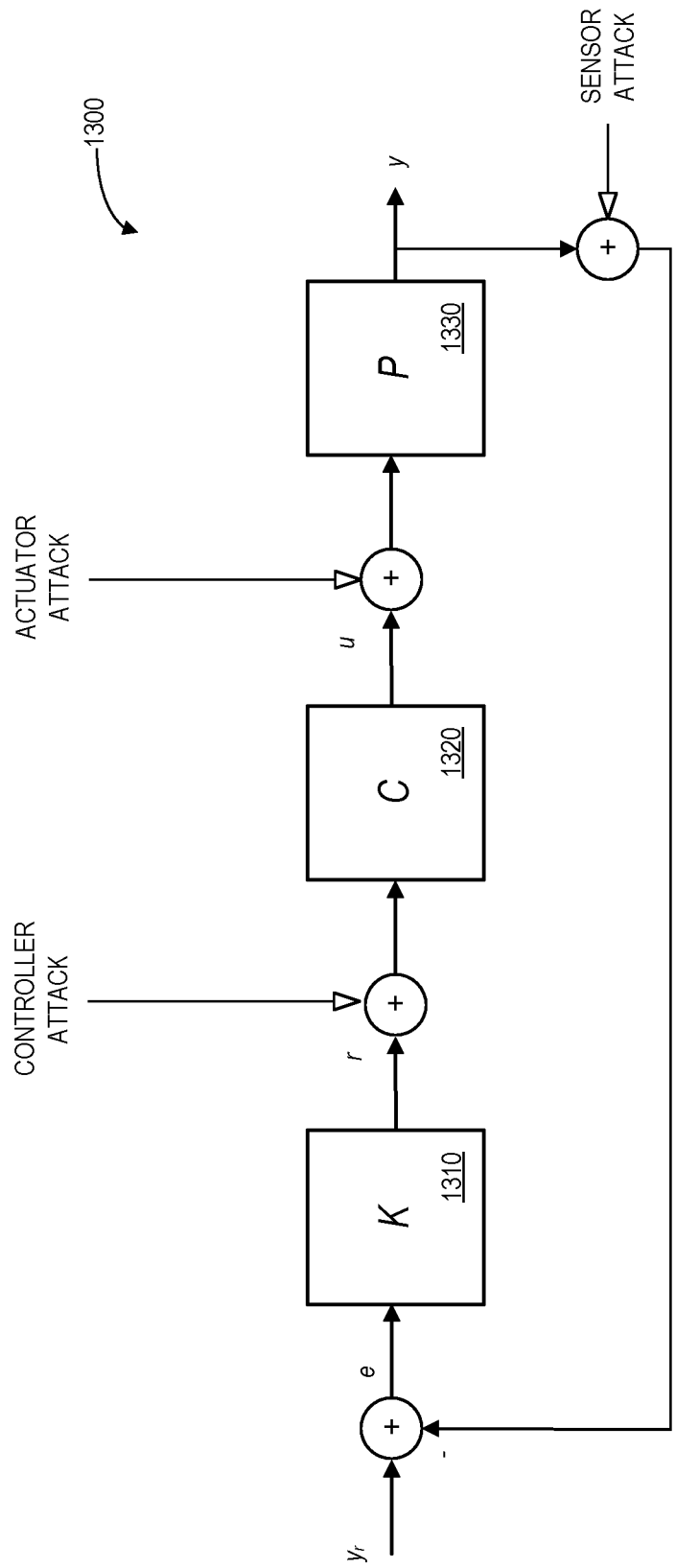
FIG. 13 is an example of a feedback loop configuration and injected attacks according to some embodiments.

The data might be collected from sensor nodes y, actuator nodes u, and/or controller nodes r, from a closed-loop feedback control system. For example, FIG. 13 is an example of a feedback loop configuration 1300 and injected attacks according to some embodiments. The loop includes elements K 1310, C 1320, and P 1330. K and C might be associated with a control system model and P might be associated with a plant model. Note that in this configuration 1300, the output r might be subject to a controller attack, the output u might be subject to an actuator attack, and the overall output p might be subject to a sensor attack.

Figure 14:
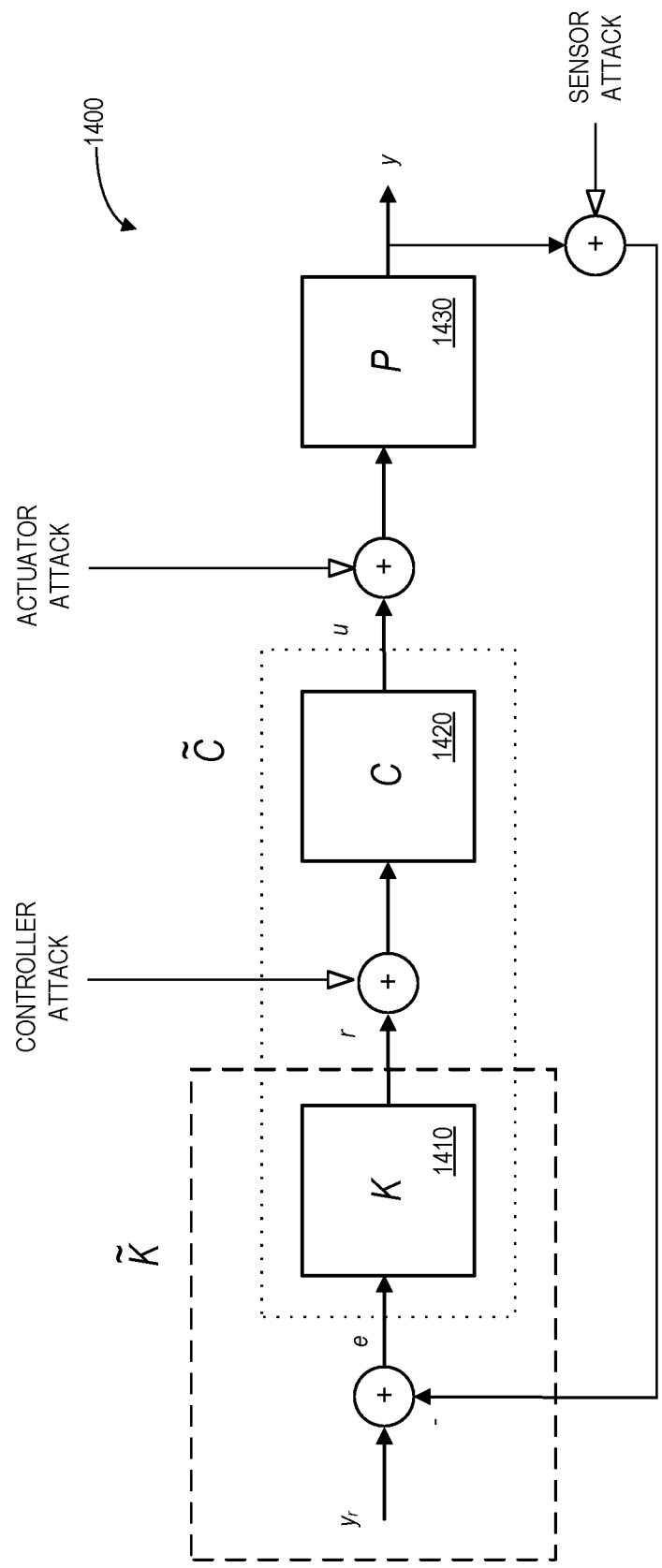
FIG. 14 is a more detailed example of a feedback loop configuration and injected attacks according to some embodiments.

FIG. 14 is a more detailed example of a feedback loop configuration 1400 and injected attacks according to some embodiments. The signals u and y represent one or more actuators and sensors, which are the input and outputs to the plant P 1430. The controller $\tilde{C}$ (including K 1410 and C 1420) receives the error between the measurement feedback y and the desired set-points $y_r$ and generates control commands u, which are commanded to the actuators. Note that each model could be SISO, SIMO, MISO or MIMO based on the number of available input-output data channels associated with the model. The monitoring nodes used in some embodiments may be selected based on domain knowledge to be all or a subset of data nodes available.

With respect to the plant model, suppose sensor monitoring nodes data y and actuator monitoring nodes u are available. A plant model P 1430 may be identified using the inputs u and outputs y of the plant. Note that P is a (sub-)model of the true plant representing the dynamic relationship between the available sensor and actuator data. The data may be preprocessed (detrending, denoising, outlier removal, etc.) before performing the system identification.

With respect to the control system model, if data for the desired set-points corresponding to the sensor monitoring nodes are available, the control system model $\tilde{C}$ can be identified in a similar fashion as the plant model. Alternatively, the data for the whole controller $\tilde{C}$ input-output might not be available, but data of some internal variables of the controller might be available. These are the controller monitoring nodes, depicted as r. Using these monitoring nodes data, the controller $\tilde{C}$ may be split into two sub-controllers. The first sub-controller K receives the error e between the sensor measurements and the desired set-points and generates r, while the second sub-controller C 1420, receives r and generates u. The sub-controller K may represent the unknown portion of the controller $\tilde{C}$ for which the field data is not accessible, or may be thought of as the outer-loop supervisory control which provides set-points to the inner-loop controller. Using this controller splitting, a dynamic model for C 1420 may be identified using its available input-output data r and u as shown in FIG. 14.

Note that the system may also model the unknown portion of the controller assuming the unknown set point to be is part of the system to be identified. This controller may be referred to as $\tilde{K}$ as shown in FIG. 14. This controller may be identified using its input data y and output data r (which are available). Furthermore, multiple models might be identified for the plant or each of the sub-controllers representing different modes of operation or different ambient conditions on different dates.

Figure 15:
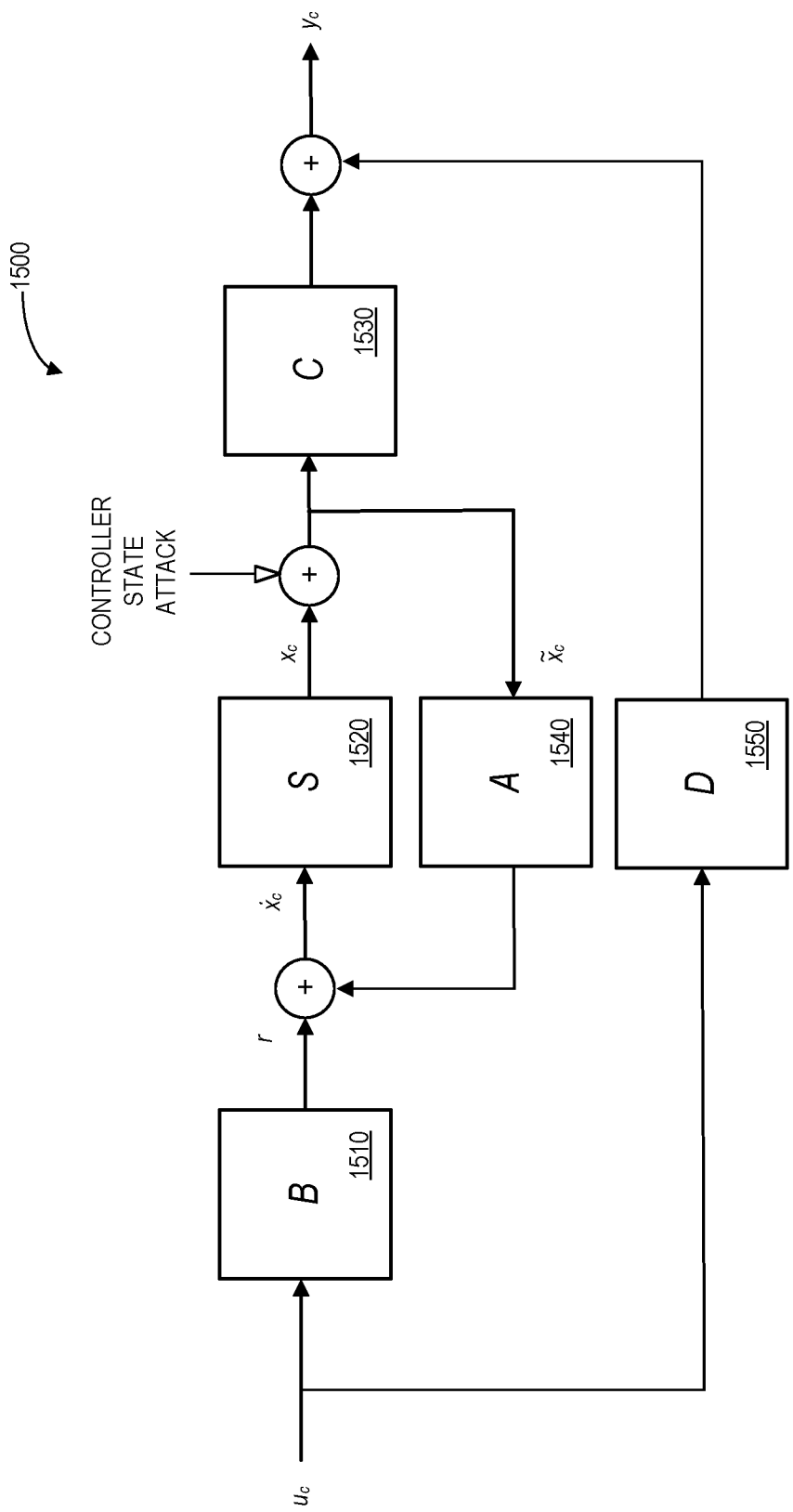
FIG. 15 illustrates attacks injected into controller states in accordance with some embodiments.

With respect to synthetic attacks injection, FIG. 15 illustrates 1500 attacks injected into controller states in accordance with some embodiments. In particular, the states include B 1510, S 1520, C 1530, A 1540, and D 1550. The illustration 1500 might represent, for example, the controller C 1420 of FIG. 14. In this step, simulated attacks may be generated and injected into different monitoring nodes. Note that different type of attacks can be considered with different magnitudes and patterns. Attacks could, for example, add a constant or time-varying bias into the signals, spoof the signal, mask and replay it, etc. Any combinations of sensor/actuator/controller nodes may be considered as the attack nodes. In addition, if a control system model C or $\tilde{K}$ as illustrated in FIG. 14 is identified, the controller state attacks might also be synthesized as shown in FIG. 15 where $y_c$ and $u_c$ correspond to outputs and inputs to the controller C. Note that if access to both $y_r$ and r are available, the system might still split the controller and identify C and $\tilde{K}$ separately, rather than identifying $\tilde{C}$ as a whole, so that attacks can still be injected into r. Note that the attacks injected into controller states illustrated in FIG. 15 might also be arranged as follows:

$$\dot{x}_c = Ax_c + Bu_c$$

$$y_c = Cx_c + Du_c$$

where (A, B, C, D) matrices represent the state space realization of a (sub-)controller.

With respect to normal and attack data points collection, normal time series of the monitoring nodes might be readily available from the field data. If additional normal data points are needed, they can be synthesized using the identified models. Attack time series may be collected by injecting the attacks into different (and potentially multiple attacks at a time) attack nodes, and simulating with the identified dynamic models.

Figure 16:
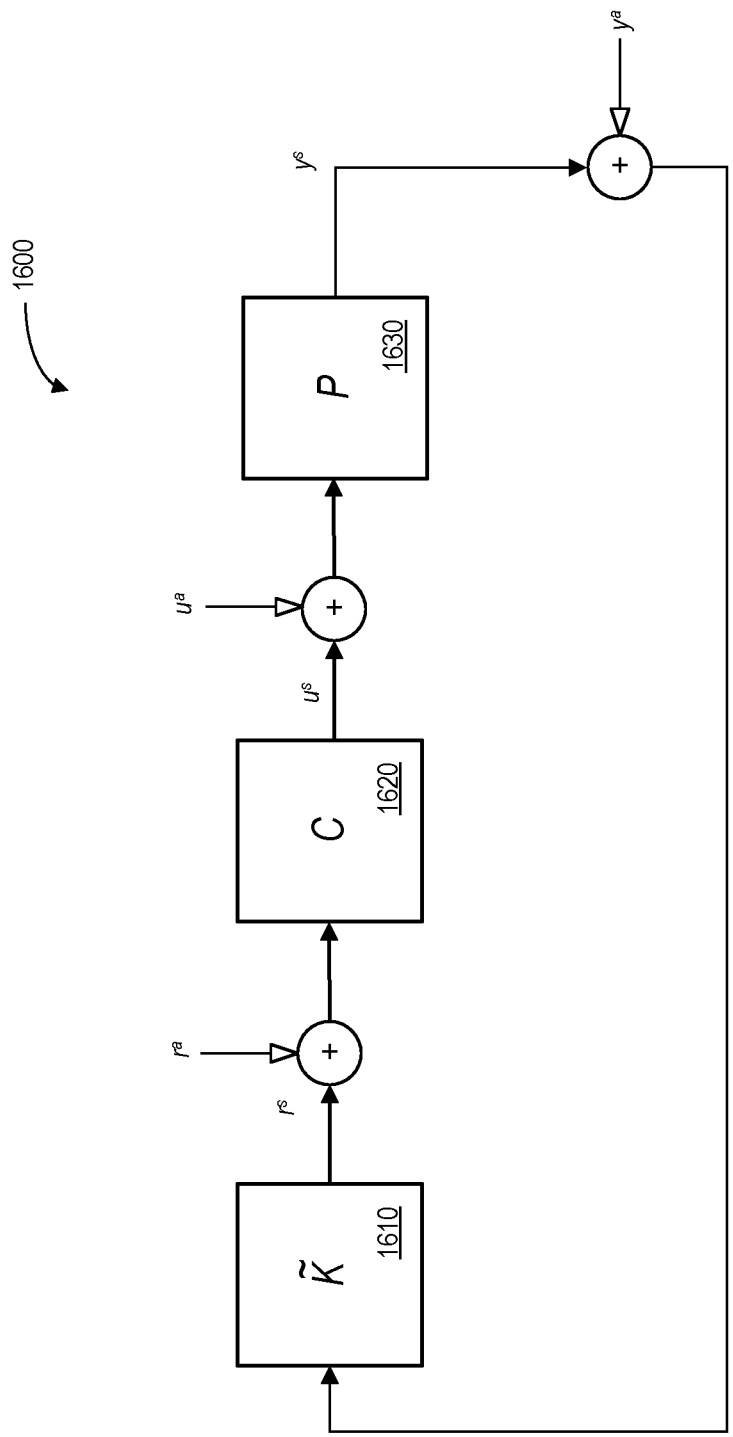
FIG. 16 illustrates an example of models arranged in a closed loop according to some embodiments.
Figure 17:
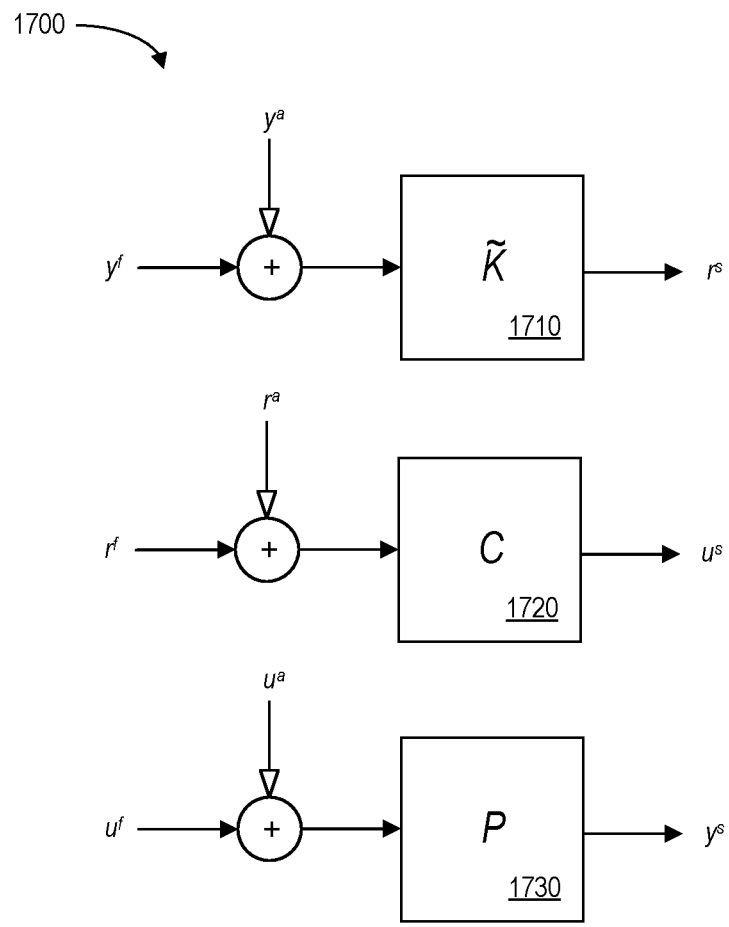
FIG. 17 illustrates an example of models running separately in accordance with some embodiments.

Each identified dynamic model can be simulated independently or in an interconnected fashion with other identified dynamic models. For example, FIG. 16 illustrates an example 1600 of models arranged in a closed loop according to some embodiments. As another example, FIG. 17 illustrates an example 1700 of models running separately in accordance with some embodiments. Note that inputs and outputs might be defined as follows:

$y^f$, $r^f$, $u^f$: field data
$y^s$, $r^s$, $u^s$: synthetic data
$y^a$, $r^a$, $u^a$: injected attacks Note that various configurations are possible. For example, the system may start with an initial condition given from the field data, and simulate the fully interconnected feedback loop comprising $\tilde{K}$, C, P, output of each feeding to the input of the other while attacks are injected into different nodes. Alternatively, fully independent simulations might be done, by separately inputting each model from the recorded field data along with the injected attacks and recording its outputs. Any other combination of partial interconnections is also possible as illustrated in FIGS. 16 and 17. If the exogenous set-points $y_r$ are available, set-point attacks might be also injected and simulated according to some embodiments.

With respect to decision boundary generation, once the normal and attack time series data (both synthetic and field data) are collected, the features may be extracted from the data to generate normal and attack data points in the feature space. The term "feature" may refer to, for example, mathematical characterizations of data. Examples of features as applied to data might include the maximum and minimum, mean, standard deviation, variance, settling time, Fast Fourier Transform ("FFT") spectral components, linear and non-linear principal components, independent components, sparse coding, deep learning, etc. The type and number of features for each monitoring node, might be optimized using domain-knowledge, feature engineering, or ROC statistics. The local features for each monitoring node may be stacked to create the global feature vector. The features may be normalized and the dimension of the global feature vector can then be further reduced using any dimensionality reduction technique such as PCA. The features may be calculated over a sliding window of the signal time series. The length of the window and the duration of slide might be determined, for example, from domain knowledge and inspection of the data or using batch processing.

The extracted features may then be used to train a classification decision boundary using machine learning. Any classification method might be used, such as SVM, deep learning neural networks, or extreme learning machines with linear or nonlinear kernels. The decision boundaries may be learned for the global feature vectors or for each individual monitoring node using corresponding local feature vectors. The feature data might be clustered as a separate decision boundaries learned for each data cluster. The global decision boundary (or boundaries) may be used in the global attack detection, and the local decision boundaries may be used for attack localization.

Figure 18:
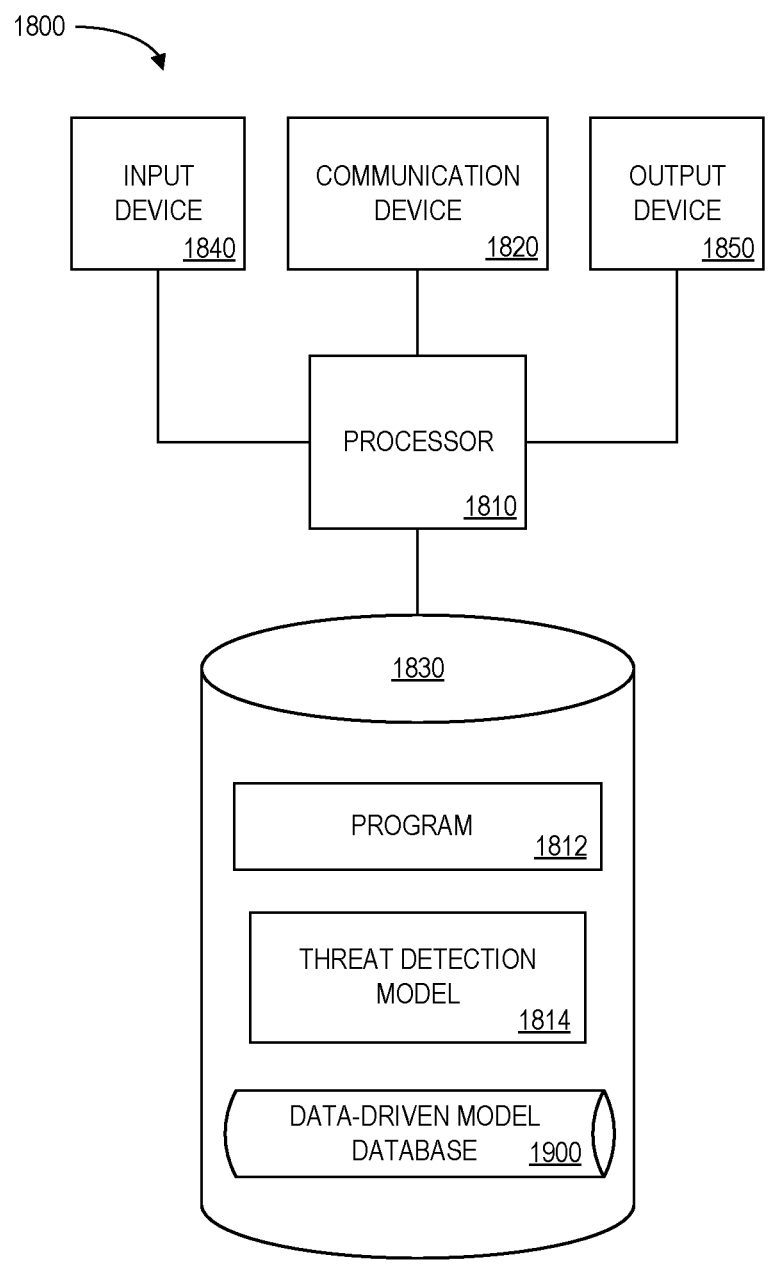
FIG. 18 is a block diagram of an industrial asset protection platform according to some embodiments of the present invention.

The embodiments described herein may be implemented using any number of different hardware configurations. For example, FIG. 18 is a block diagram of an industrial asset protection platform 1800 that may be, for example, associated with the systems 600, 900 of FIGS. 6 and 9 respectively. The industrial asset protection platform 1800 comprises a processor 1810, such as one or more commercially available Central Processing Units ("CPUs") in the form of one-chip microprocessors, coupled to a communication device 1860 configured to communicate via a communication network (not shown in FIG. 18). The communication device 1860 may be used to communicate, for example, with one or more remote monitoring nodes, user platforms, digital twins, etc. The industrial asset protection platform 1800 further includes an input device 1840 (e.g., a computer mouse and/or keyboard to input adaptive and/or predictive modeling information) and/an output device 1850 (e.g., a computer monitor to render a display, provide alerts, transmit recommendations, and/or create reports). According to some embodiments, a mobile device, monitoring physical system, and/or PC may be used to exchange information with the industrial asset protection platform 1800.

The processor 1810 also communicates with a storage device 1830. The storage device 1830 may comprise any appropriate information storage device, including combinations of magnetic storage devices (e.g., a hard disk drive), optical storage devices, mobile telephones, and/or semiconductor memory devices. The storage device 1830 stores a program 1812 and/or a threat detection model 1814 for controlling the processor 1810. The processor 1810 performs instructions of the programs 1812, 1814, and thereby operates in accordance with any of the embodiments described herein. For example, the processor 1810 may receive, from a system node data store, system node data associated with an industrial asset. The processor 1810 may automatically construct a data-driven, dynamic system model for the industrial asset based on the received system node data. The processor 1810 may then inject at least one synthetic attack into the data-driven, dynamic system model to create, for each of a plurality of monitoring nodes, a series of synthetic attack monitoring node values over time that represent simulated attacked operation of the industrial asset. The processor 1810 may store the series of synthetic attack monitoring node values over time that represent simulated attacked operation of the industrial asset. This information may then be used, for example, by the processor 1810 along with normal operational data to construct a threat detection model for the industrial asset.

The programs 1816, 1814 may be stored in a compressed, uncompiled and/or encrypted format. The programs 1816, 1814 may furthermore include other program elements, such as an operating system, clipboard application, a database management system, and/or device drivers used by the processor 1810 to interface with peripheral devices.

As used herein, information may be "received" by or "transmitted" to, for example: (i) the industrial asset protection platform 1800 from another device; or (ii) a software application or module within the industrial asset protection platform 1800 from another software application, module, or any other source.

In some embodiments (such as the one shown in FIG. 18), the storage device 1830 further stores a data-driven model database 1900. An example of a database that may be used in connection with the industrial asset protection platform 1800 will now be described in detail with respect to FIG. 19. Note that the database described herein is only one example, and additional and/or different information may be stored therein. Moreover, various databases might be split or combined in accordance with any of the embodiments described herein.

Referring to FIG. 19, a table is shown that represents the data-driven model database 1900 that may be stored at the industrial asset protection platform 1800 according to some embodiments. The table may include, for example, entries identifying industrial assets to be protected. The table may also define fields 1902, 1904, 1906, 1908, 1910, 1912 for each of the entries. The fields 1902, 1904, 1906, 1908, 1910, 1912 may, according to some embodiments, specify: an industrial asset identifier 1902, an industrial asset description 1904, a model identifier 1906, a model type 1908, an order 1910, and input/output channels 1912. The data-driven model database 1900 may be created and updated, for example, when a new physical system is monitored or modeled, existing systems are upgraded, etc.

The industrial asset identifier 1902 and description 1904 may define a particular machine or system that will be protected. The model identifier 1906 might be a unique alphanumeric code identifying a particular data-driven, dynamic system model. The model type 1908 might indicate if it is a control system model, plant model, etc. The order 1910 might be automatically selected (e.g., via a Hankel norm analysis). The input/output channels 1912 might indicate how many input channels and output channels are supported by the model.

Thus, embodiments may provide technical advantages, such as enabling attack synthesis without having high-fidelity models (which normally require time and involve cost). Embodiments may also enable supervised classification which outperforms semi-supervised classification based on using normal only data. Some embodiments may address un-met needs for legacy systems from various manufacturers of power generation assets (and other types of industrial assets).

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases described herein may be combined or stored in external systems). For example, although some embodiments are focused on gas turbine generators, any of the embodiments described herein could be applied to other types of assets, such as dams, the power grid, military devices, etc.

Embodiments might be tested any number of different ways. In the case of a gas turbine, for example, field data might be collected from an operational site. It may be determined that the system has a particular number of controller nodes, actuator nodes, and sensor nodes. The system may construct $\tilde{K}$, C, P models using subspace method N4SID. The order of each model might be selected automatically using Hankel norm analysis. The models are identified as Linear Time-Invariant ("LTI") state spaces with tuned tradeoff between prediction error and stability.

The system may select three monitoring nodes as the attacked nodes, one sensor node, one actuator node and one controller node. The attacks may be injected using Pseudo Random Binary Sequence ("PRBS") patterns. Each attack might be, for example, a constant bias with a positive and a negative amplitude based on the value of the PRBS signal.

The features may be calculated over a sliding window of a pre-determined number of seconds. To evaluate a boundary an independent set of normal and attack synthetic data may be generated and tested against the decision boundary.

FIG. 20 illustrates results according to some embodiments associated with a gas turbine. The model has two classes, normal (N) and attack (A). The tables 2010, 2020 show the number and percentage of each actual class in the data vs. those predicted by the decision boundaries. In each table, the numbers of the main diagonal represent correct classifications while the numbers on the off-diagonals represent misclassifications. As seen in the tables 2010, 2020, the total size of the evaluation data set is 950, which consistent of 500 normal cases and 450 attack cases. The number of cases in each class might be selected randomly. The evaluation results are summarized in the tables 2010, 2020. As can be seen, the false positive rate is 0.6% and the false negative rate is 5%.

Figure 21:
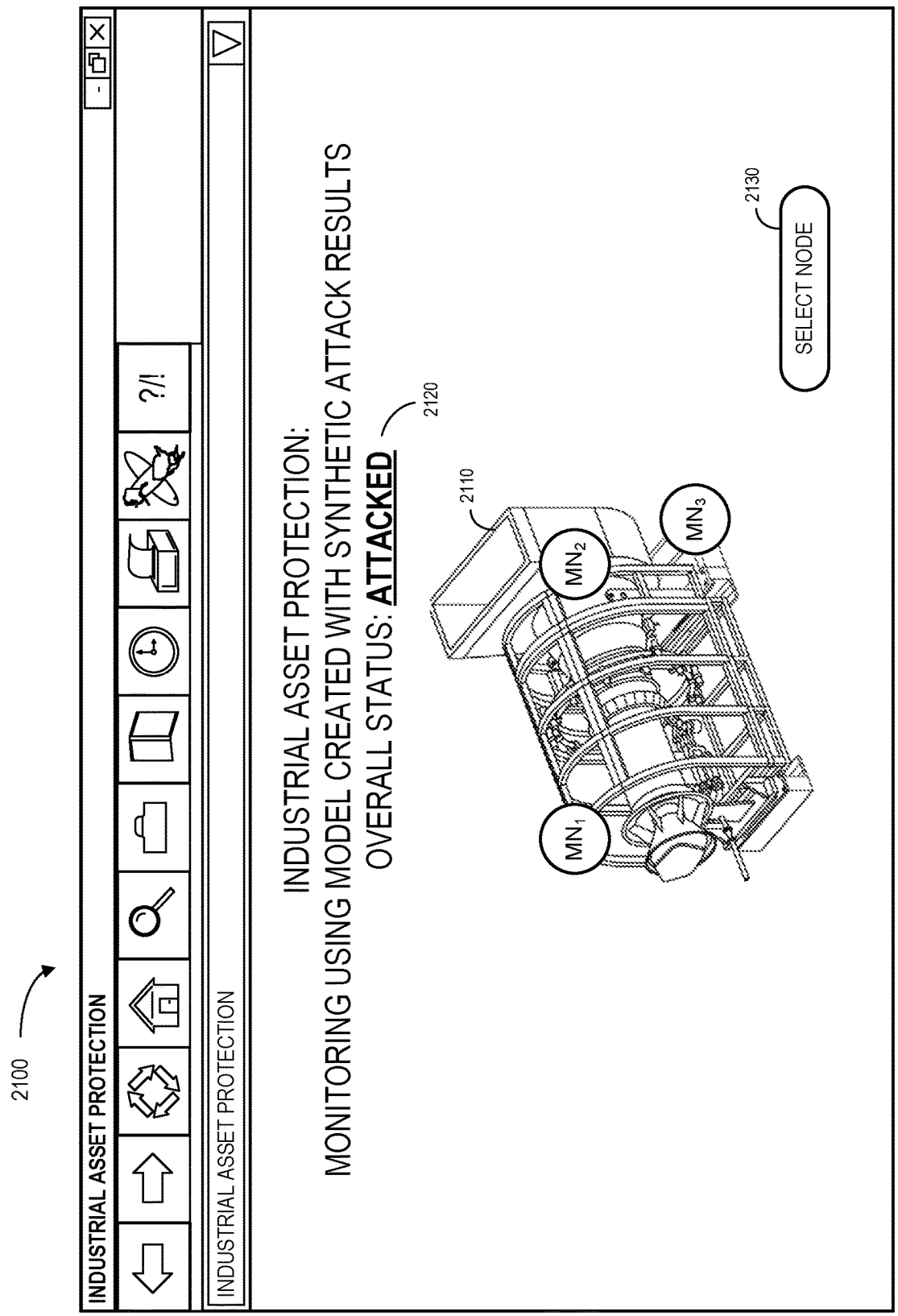
FIG. 21 is a threat monitoring system display in accordance with some embodiments.

FIG. 21 is a threat detection system display 2100 in accordance with some embodiments. The display 2100 includes information about an industrial asset 2110 having a number of monitoring nodes ($MN_1$ through $MN_2$). In particular, the display 2100 might include an overall current system status 2120 as determined by any of the embodiments described herein. According to some embodiments, the display 2100 is interactive and may be used by an operator to determine more detailed information (e.g., via selection of an icon 2130) and/or to adjust the operation of the system.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system to protect an industrial asset, comprising:
   a system node data store storing system node data associated with the industrial asset;
   a system model construction platform, coupled to the system node data store, to receive the system node data associated with the industrial asset and to automatically construct a data-driven, dynamic system model for the industrial asset based on the received system node data;
   a synthetic attack platform to inject at least one synthetic attack into the data-driven, dynamic system model to create, for each of a plurality of monitoring nodes, a series of synthetic attack monitoring node values over time that represent simulated attacked operation of the industrial asset;
   a synthetic attack space data source to store, for each of the plurality of monitoring nodes, the series of synthetic attack monitoring node values over time that represent simulated attacked operation of the industrial asset;
   a normal space data source storing, for each of the plurality of monitoring nodes, a series of normal monitoring node values over time that represent normal operation of the industrial asset; and
   a threat detection model creation computer, coupled to the normal space data source and the synthetic attack space data source, to:
   (i) receive the series of normal monitoring node values and generate a set of normal feature vectors,
   (ii) receive the series of synthetic attack monitoring node values and generate a set of attacked feature vectors, and
   (iii) automatically calculate and output at least one feature-based decision boundary for a threat detection model based on the set of normal feature vectors and the set of attacked feature vectors.

2. The system of claim 1, wherein the data-driven, dynamic system model is built in state-space and using one of black-box and grey-box system identification techniques.

3. The system of claim 1, wherein a plurality of data-driven, dynamic system models are automatically constructed.

4. The system of claim 3, wherein at least one of the data-driven, dynamic system models are associated with at least one of: (i) a plant model of the industrial asset, (ii) a controller model of the industrial asset, and (iii) a sub-controller model of the industrial asset.

5. The system of claim 1, wherein the data-driven, dynamic system model is associated with a linear or non-linear model.

6. The system of claim 1, wherein the data-driven, dynamic system model is associated with an order automatically selected by the system model construction platform.

7. The system of claim 6, wherein the selection is performed via a Hankel norm analysis.

8. The system of claim 6, wherein parameters of the data-driven, dynamic system model are estimated via a system identification method associated with at least one of: (i) Prediction Error ("PE") minimization, (ii) subspace methods, (iii) Subspace State Space System Identification ("N4SID"), and (iv) Eigen-system Realization Algorithm ("ERA") techniques.

9. The system of claim 1, wherein the data-driven, dynamic system model is associated with one of: (i) a Single-Input, Single-Output ("SISO") model, (ii) a Single-Input, Multi-Output ("SIMO") model, (ii) a Multi-Input, Single-Output ("MISO") model, and (iv) a Multi-Input, Multi-Output ("MIMO") model.

10. The system of claim 1, further comprising:
the plurality of monitoring nodes each generating a series of current monitoring node values over time that represent a current operation of the industrial asset; and
a threat detection computer, coupled to the plurality of monitoring nodes, to:
(i) receive the series of current monitoring node values and generate a set of current feature vectors,
(ii) access the threat detection model having the at least one feature-based decision boundary, and
(iii) execute the at least one threat detection model and transmit a threat alert based on the set of current feature vectors and the at least one feature-based decision boundary, wherein the threat alert indicates whether a monitoring node status is normal or abnormal.

11. The system of claim 10, wherein at least one monitoring node is associated with at least one of: (i) a sensor node, (ii) a critical sensor node, (iii) an actuator node, (iv) a controller node, and (v) a key software node.

12. The system of claim 10, wherein the set of current feature vectors includes at least one of: (i) a local feature vector associated with a particular monitoring node, and (ii) a global feature vector associated with a plurality of monitoring nodes.

13. The system of claim 10, wherein the set of current feature vectors are associated with at least one of: (i) principal components, (ii) statistical features, (iii) deep learning features, (iv) frequency domain features, (v) time series analysis features, (vi) logical features, (vii) geographic or position based locations, and (viii) interaction features.

14. The system of claim 10, wherein the threat detection model is associated with at least one of: (i) an actuator attack, (ii) a controller attack, (iii) a monitoring node attack, (iv) a plant state attack, (v) spoofing, (vi) financial damage, (vii) unit availability, (viii) a unit trip, (ix) a loss of unit life, and (x) asset damage requiring at least one new part.

15. The system of claim 14, wherein information from each of the plurality of monitoring nodes is normalized and an output is expressed as a weighted linear combination of basis functions.

16. The system of claim 10, wherein the at least one feature-based decision boundary is associated with at least one of: (i) a line, (ii) a hyperplane, and (iii) a non-linear boundary.

17. The system of claim 10, wherein the at least one feature-based decision boundary exists in a multi-dimensional space and is associated with at least one of: (i) a dynamic model, (ii) design of experiment data, (iii) machine learning techniques, (iv) a support vector machine, (v) a full factorial process, (vi) Taguchi screening, (vii) a central composite methodology, (viii) a Box-Behnken methodology, (ix) real-world operating conditions, (x) a full-factorial design, (xi) a screening design, and (xii) a central composite design.

18. The system of claim 14, wherein at least one of the normal and synthetic attack monitoring node values are obtained by running design of experiments on an industrial control system associated with at least one of: (i) a turbine, (ii) a gas turbine, (iii) a wind turbine, (iv) an engine, (v) a jet engine, (vi) a locomotive engine, (vii) a refinery, (viii) a power grid, and (ix) an autonomous vehicle.

19. A computerized method to protect an industrial asset, comprising:
receiving, at a system model construction platform from a system node data store, system node data associated with the industrial asset;
automatically constructing, by the system model construction platform, a data-driven, dynamic system model for the industrial asset based on the received system node data;
injecting, by a synthetic attack platform, at least one synthetic attack into the data-driven, dynamic system model to create, for each of a plurality of monitoring nodes, a series of synthetic attack monitoring node values over time that represent simulated attacked operation of the industrial asset;
storing, by the synthetic attack platform in a synthetic attack space data source, for each of the plurality of monitoring nodes, the series of synthetic attack monitoring node values over time that represent simulated attacked operation of the industrial asset;
receiving, by a threat detection model creation computer coupled to a normal space data source and the synthetic attack space data source, a series of normal monitoring node values and generating a set of normal feature vectors, wherein the normal space data source stores, for each of the plurality of monitoring nodes, the series of normal monitoring node values over time that represent normal operation of the industrial asset;
receiving, by the threat detection model creation computer, the series of synthetic attack monitoring node values and generating a set of attacked feature vectors; and
automatically calculating and outputting, by the threat detection model creation computer, at least one feature-based decision boundary for a threat detection model based on the set of normal feature vectors and the set of attacked feature vectors.

20. The method of claim 19, wherein a plurality of data-driven, dynamic system models are automatically constructed, and further wherein at least one of the data-driven, dynamic system models are associated with at least one of: (i) a plant model of the industrial asset, (ii) a controller model of the industrial asset, and (iii) a sub-controller model of the industrial asset.

21. A non-transitory, computer-readable medium storing instructions that, when executed by a computer processor, cause the computer processor to perform a method to protect an industrial asset, the method comprising:

receiving, at a system model construction platform from a system node data store, system node data associated with the industrial asset;

automatically constructing, by the system model construction platform, a data-driven, dynamic system model for the industrial asset based on the received system node data;

injecting, by a synthetic attack platform, at least one synthetic attack into the data-driven, dynamic system model to create, for each of a plurality of monitoring nodes, a series of synthetic attack monitoring node values over time that represent simulated attacked operation of the industrial asset;

storing, by the synthetic attack platform in a synthetic attack space data source, for each of the plurality of monitoring nodes, the series of synthetic attack monitoring node values over time that represent simulated attacked operation of the industrial asset;

receiving, by a threat detection model creation computer coupled to a normal space data source and the synthetic attack space data source, a series of normal monitoring node values and generating a set of normal feature vectors, wherein the normal space data source stores, for each of the plurality of monitoring nodes, the series of normal monitoring node values over time that represent normal operation of the industrial asset;

receiving, by the threat detection model creation computer, the series of synthetic attack monitoring node values and generating a set of attacked feature vectors; and automatically calculating and outputting, by the threat detection model creation computer, at least one feature-based decision boundary for a threat detection model based on the set of normal feature vectors and the set of attacked feature vectors.

22. The medium of claim 21, wherein a plurality of data-driven, dynamic system models are automatically constructed, and further wherein at least one of the data-driven, dynamic system models are associated with at least one of: (i) a plant model of the industrial asset, (ii) a controller model of the industrial asset, and (iii) a sub-controller model of the industrial asset.

\* \* \* \* \*